United States Patent [19]

Lockard et al.

[11] Patent Number: 4,555,121

[45] Date of Patent: Nov. 26, 1985

[54] INVALID'S CHAIR TO FACILITATE TRANSFER TO AN AUTOMOBILE

[75] Inventors: Walter G. Lockard; Nathalal G. Patel; Allen J. Boris, all of Elyria, Ohio

[73] Assignee: Invacare Corporation, Elyria, Ohio

[21] Appl. No.: 652,289

[22] Filed: Sep. 20, 1984

[51] Int. Cl.[4] .............................................. B62B 11/00

[52] U.S. Cl. ...................................... 280/30; 280/648; 280/650; 280/657; 280/289 WC; 414/921

[58] Field of Search ...................... 280/30, 47.38, 642, 280/643, 657, 658, 33.99 F, 289 WC; 414/921, 498; 5/81 R

[56] References Cited

U.S. PATENT DOCUMENTS

Re. 30,867 2/1982 Gaffney .............................. 280/642

4,365,924 12/1982 Bridgman et al. .......... 280/289 WC

*Primary Examiner*—David M. Mitchell

*Assistant Examiner*—Richard M. Camby

*Attorney, Agent, or Firm*—Fay, Sharpe, Fagan, Minnich & McKee

[57] ABSTRACT

A stroller base (A) detachably receives a seat structure (B) therein. The base includes forward wheel assemblies (12), rearward wheel assemblies (14) for rollably supporting the base, and wheel lock structures (60) for selectively locking the rear wheels against rotation. An upper base frame portion (20) is collapsable to a folded position (FIG. 3) and raiseable to a seat structure receiving position (FIG. 2). The upper base frame portion includes a channel guide (30) having a transverse slot (38) therein. The detachable seat structure includes a seat frame (80) with a plurality of patient supporting pads (90, 92, 94, 96) adjustably mounted thereon. Handles (84) selectively enable an attendant to lift a rearward portion of the detachable seat structure. A transverse seat frame member (88) is selectively received in the channel guide slot as the seat structure is positioned thereon and selectively lifted out of the channel guide slot as the seat is lifted therefrom. The seat frame adjustably mounts a footrest structure (140) and a roller (130) at a forward, lower end thereof. In operation, the attendant pivots the detachable seat structure about the transverse seat frame member to raise the roller above a door sill of a motor vehicle. The stroller is moved forward with the forward wheel assemblies passing below the door sill and the roller passing above the door sill. The attendant lifts the detachable seat structure by the handles raising the transverse bar from the channel guide and pivoting the chair about the roller until it is positioned over the seat of the motor vehicle. Thereafter, the base is folded and disposed in the trunk of the motor vehicle.

18 Claims, 8 Drawing Figures

INVALID'S CHAIR TO FACILITATE TRANSFER TO AN AUTOMOBILE

BACKGROUND OF THE INVENTION

The present invention relates to the personal vehicle art, particularly for patients and physically disabled persons. The present invention finds particular application in passenger support systems which are adapted to be received within larger vehicles, such as automobiles, for patient transport. The present invention finds particular application in a seating arrangement which is adapted to be manually propelled carrying a single patient and which is further adapted to be positioned within the passenger compartment of an automobile or other motor vehicle and will be described with particular reference thereto.

Heretofore, positioning of patients and disabled persons in the passenger compartment of a motor vehicle was relatively difficult. Commonly a wheelchair or like vehicle was positioned adjacent an open door of a motor vehicle. The patient or disabled person was then manually lifted or slid from the wheelchair to the motor vehicle seat. The wheelchair was frequently folded and placed in the vehicle trunk. Upon disembarking the motor vehicle, the process was reversed.

The transfer between a wheelchair and the vehicle seat was often awkward and difficult, particularly for disabled children. The geometry of the motor vehicle door relative to the seat, relatively low roof lines, the positioning of the wheelchair, and the like, provided obstacles for assisting the disabled person. Particularly, it was difficult for an assistant to position themselves in an advantageous position without reaching over or around various obstacles imposed by the wheelchair and the motor vehicle.

One chair for facilitating access into motor vehicles is illustrated in U.S. Pat. No. Re. 30,867, reissued Feb. 16, 1982 to Edward Gaffney. The Gaffney chair was designed to be positioned totally within the motor vehicle passenger compartment. The front portion of the chair was dimensioned to be positioned on the vehicle floor as a rearward portion and the wheels were slid across the vehicle seat. Sliding the rear wheels on the seat of the motor vehicle tended to soil and damage the seat. Further, various wheel mounting and underframe structures which could damage the seat further were positioned adjacent the rear wheels of the chair. To position the Gaffney chair in a normal car seat orientation required retracting the rear wheels. The retraction and extension of the rear wheels while supporting and manipulating the chair into and out of the vehicle was found by some attendants to be awkward.

The present invention contemplates a new and improved vehicle which overcomes the above-referenced problems and others.

SUMMARY OF THE INVENTION

In accordance with the present invention, there is provided a stroller for facilitating access to motor vehicles. The stroller includes a base and a detachable seat. The base includes a lower frame portion and wheels for supporting the lower frame portion such that at least a forward end of the lower frame portion is able to be rolled beneath the undercarriage of the motor vehicle. An upper base frame portion is operatively connected with the lower base frame portion and a seat supporting structure. The detachable seat includes a patient supporting portion for supporting the patient. A base engaging portion is operatively connected to the patient supporting portion for selective attachment to the base seat supporting structure. A motor vehicle floor engaging means extends downward from the patient supporting portion for selectively engaging a floor of the motor vehicle. The floor engaging means supports a forward end of the detachable seat during entry into and departure from the motor vehicle. Manually graspable handles are connected with a rearward portion of the detachable seat. The handles are manually gripped to facilitate lifting the rearward seat portion during entry into and departure from a motor vehicle.

In accordance with a more limited aspect of the present invention, the base is collapsable such that it folds smaller for storage in the trunk or the like after the detachable seat portion has been positioned within the motor vehicle.

In accordance with another aspect of the present invention, the upper base frame portion includes a reclining platform for adjusting the angular position of the detachable seat structure while interconnected with the base.

In accordance with another aspect of the present invention, the chair is adjustable to accommodate children or patients of different sizes. Arms are telescopically widenable to accommodate wider patients. The vehicle floor engaging means is selectively extendable to conform to the geometry of the motor vehicle. A footrest is adjustably positioned to accommodate different leg lengths. Back supporting pads of the detachable seat are selectively adjustable inward and outward to accommodate spinal curvature or irregularities.

In accordance with another aspect of the present invention, a retrofit brake assembly is provided for selectively locking the wheels of the stroller. The brake assembly includes a cogged member which is adapted to be interconnected with the central bearing shaft of a standard wheel. A frame mounted plunger which selectively engages the cogs is foot actuated and released.

A primary advantage of the present invention is that it facilitates the entry into and departure from motor vehicles by non-ambulatory patients.

Another advantage of the present invention is that it is suitable for use as a daily wheelchair or stroller for normal daily activities.

Another advantage of the present invention is that it is lightweight yet has great structural strength. The lightweight facilitates patient entry into the vehicle by reducing the amount of weight which the attendant must lift. Yet, the stroller is structurally strong to endure abuse and rough handling.

Still further advantages of the present invention will become apparent upon reading and understanding the following detailed description of the preferred embodiments.

BRIEF DESCRIPTION OF THE DRAWINGS

The invention may take form in various parts and arrangement of parts. The drawings are only for purposes of illustrating preferred embodiments of the invention and are not to be construed as limiting it. Wherein the figures show.

DETAILED DESCRIPTION OF THE PREFERRED EMBODIMENTS

Figure 1:
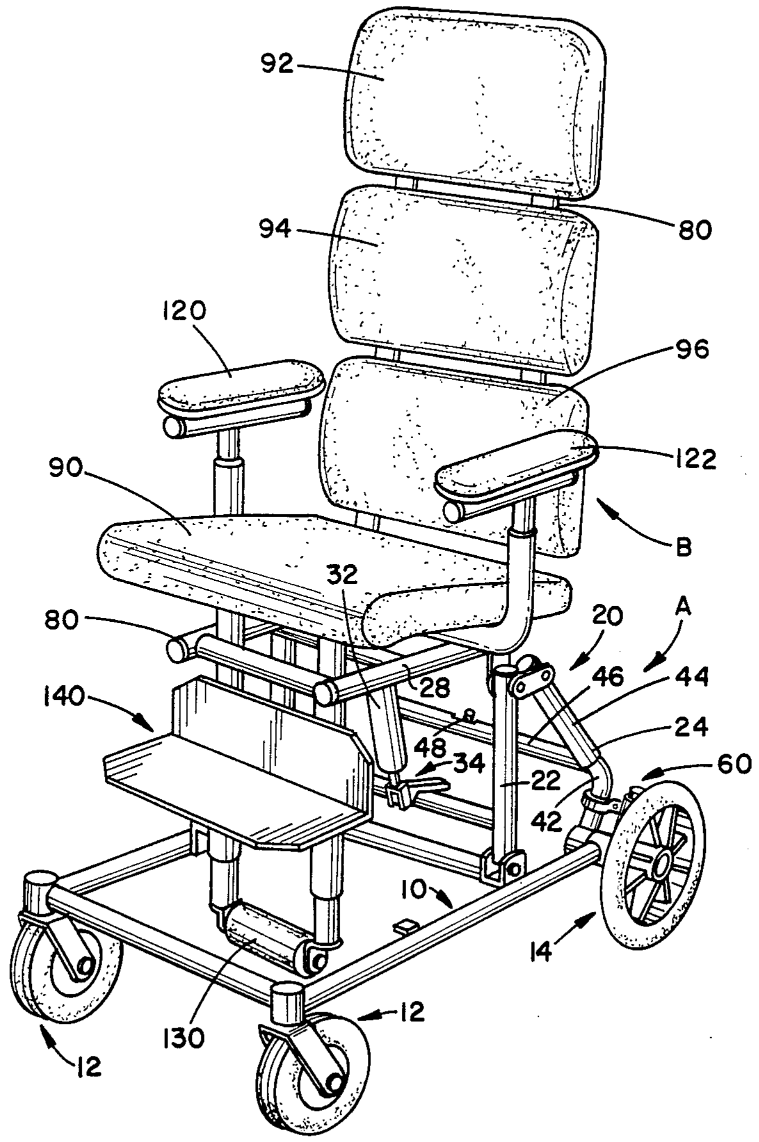
FIG. 1 is a perspective view of a stroller in accordance with the present invention.
Figure 2:
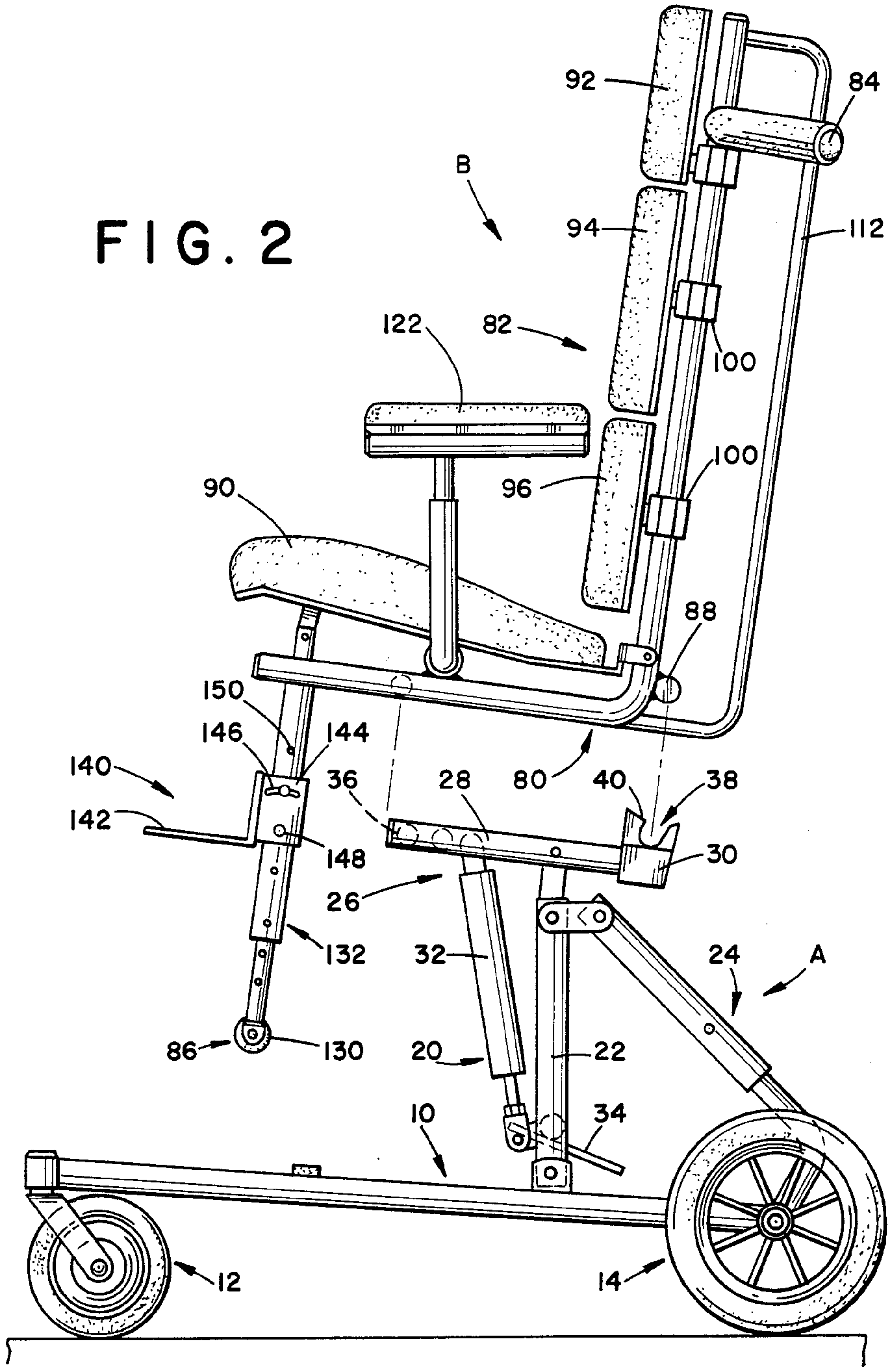
FIG. 2 is a side view of the stroller of FIG. 1 with the detachable seat structure lifted from the base.

With primary reference to FIGS. 1 and 2, the stroller includes a mobile base A to which a seat structure B is selectively attached and detached. The base A provides mobility and support for the detachable seat structure when used around the home or on the street. When the patient is to be transported in a motor vehicle, the patient and the attachable seat structure B are selectively detached from the base and positioned within the passenger compartment of the vehicle. The base A is positioned in the trunk of the motor vehicle, or the like, as may be convenient.

The base A includes a lower frame portion 10 to which front wheel casters 12 and rear wheels 14 are connected. A forward end of the lower frame portion adjacent the front wheel casters is configured to have a sufficiently low profile that it passes below the undercarriage and rocker panels of a motor vehicle adjacent its passenger door. As explained below, the detachable seat structure B is able to be transported in part into the motor vehicle while still attached to the base as the forward end of the lower frame portion is rolled under the motor vehicle.

The base A further includes an upper frame portion 20. The upper base portion includes a pair of vertical supports 22 and a pair of rearward extending telescopic braces 24 which are connected with the lower frame portion in a generally triangular relationship. A seat supporting structure 26 is disposed at an upper end of the upper frame portion. The seat supporting structure includes a platform 28 which is disposed below a horizontal portion of the detachable seat structure and a seat engaging channel guide 30 for pivotally and releasably supporting the seat structure. The platform 28 is pivotally connected with the vertical supports 22 and supported by an angular adjustment assembly 32. In the preferred embodiment, the angular adjustment assembly includes a selectively extendable gas cylinder for supporting the platform over a range of angles including a 10° forward tilt through a 30° rearward tilt from horizontal. A foot pedal operated tilt angle lock assembly 34 selectively releases and locks the angular adjustment assembly such that the angular position of the seat may be selectively adjusted and locked at the selected angular position. In this manner, the angular adjustment assembly adjusts the angular position of the seat while attached to the base. A platform connecting or locking means 36 selectively interconnects the platform with the detachable seat structure to secure the two together.

The channel guide 30 defines a horizontal channel 38 extending transversely across the upper base frame portion to receive and rotatably support a transverse extending tube of the detachable seat portion. A rearward extending overhanging lip or projection 40 partially overhangs the transverse slot 38 such that the seat structure tube cannot be lifted vertically from the transverse slot. The overhanging lip 40 interacts with the forward platform locking means 36 to retain the detachable seat structure locked to the base. Specifically, when the seat structure is connected with the platform locking means 36, the transverse member is held against motion rearward and around the overhanging lip 40. In this manner, the overhanging lip prevents the transverse member and the rear portion of the seat structure from being lifted from the slot. When the seat structure is disengaged from the platform locking means 36, the seat structure is free to pivot about the transverse slot 38 independent of the position of the platform 28. Moreover, the detachable seat structure may be freely lifted upward and rearward from the transverse slot 38 as the detachable seat structure is positioned in the motor vehicle. Analogously, as the detachable seat structure is removed from the motor vehicle, the transverse slot 38 readily receives the seat structure transverse member therein.

Figure 3:
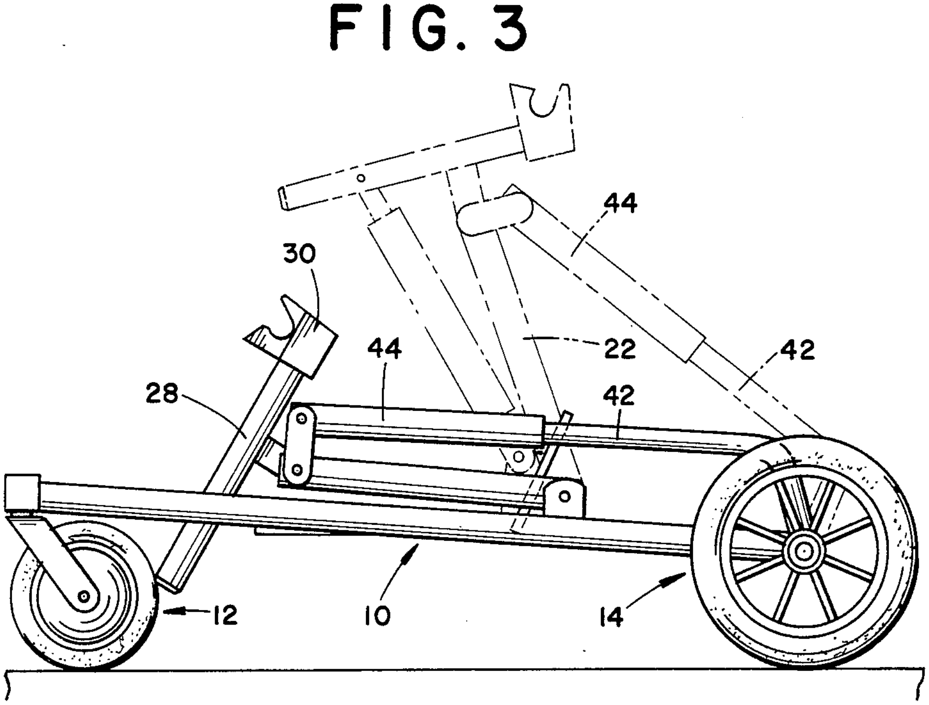
FIG. 3 is a side view of the base illustrating a folding configuration.
Figure 4:
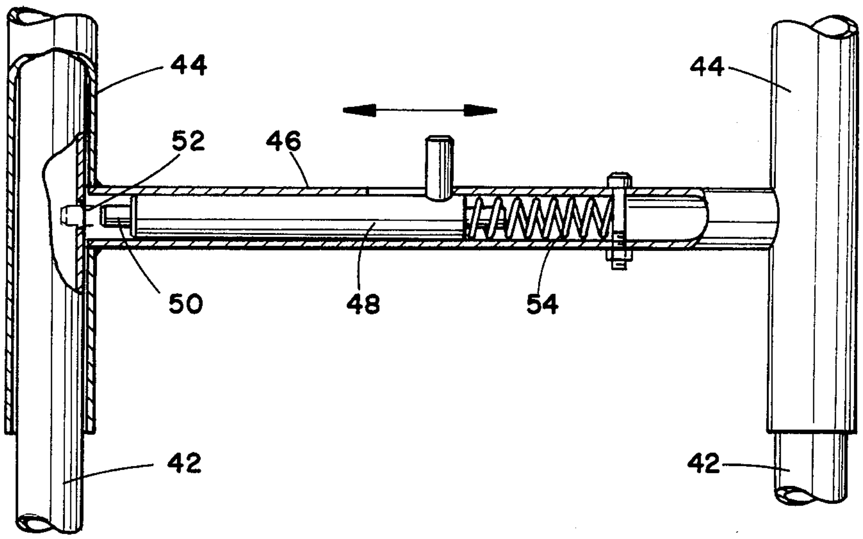
FIG. 4 illustrates a release mechanism for locking the base in the upright configuration of FIG. 2 and releasing it to be folded as illustrated in FIG. 3.

With reference to FIGS. 3 and 4, the telescoping brace assembly 24 includes a pair of telescopically received bars 42 and a pair of telescopically receiving members 44. The telescoping members are interconnected by a transverse member 46. A telescopic member locking means includes a slide tab 48 which is interconnected with a transverse pawl 50 extending through the transverse member. The pawl selectively engages aperture 52 in the telescopically received member 42. A spring 54 biases the pawl 50 into engagement with the telescopically received member aperture 52. In this manner, the tab and pawl selectively lock the telescopic tubes against relative sliding movement to lock the upper frame portion in the upright position of FIG. 2. By moving the tab 48 against the spring, the telescopic tubes may be selectively released to allow the upper frame portion to be folded flat as illustrated in FIG. 3. Optionally, a tab locking means, not shown, may be provided for preventing unintentional folding of the base.

Figure 5:
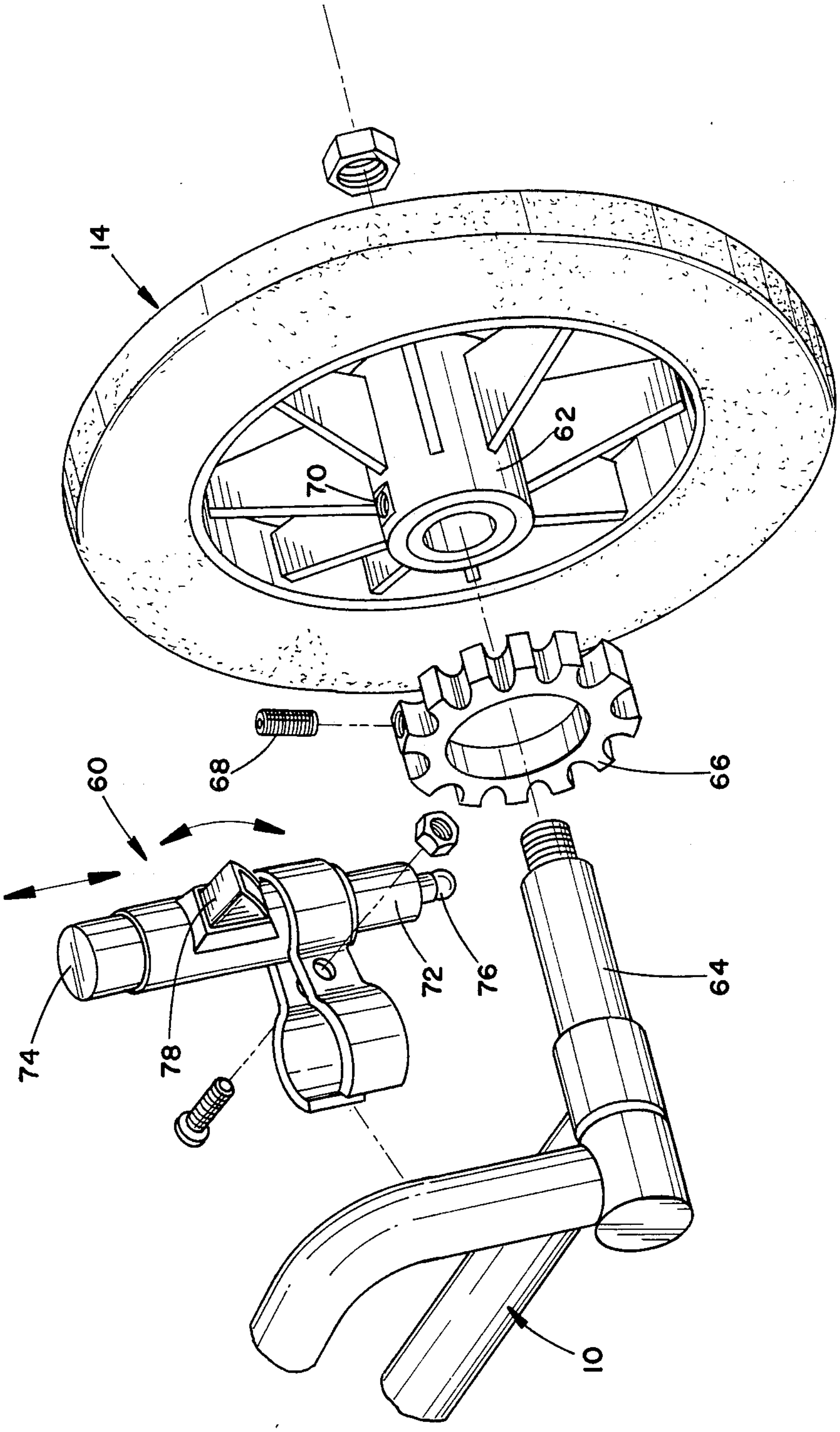
FIG. 5 illustrates a brake arrangement for the rear wheels of the base.

With reference to FIGS. 1 and 5, each rear wheel 14 includes a foot operated wheel lock 60 which is retrofitted to an existing wheel structure. Each rear wheel includes a central hub 62 which houses bearings and other structures to improve its rolling receipt on an axle 64. The wheel lock 60 includes a cogged collar 66 which is dimensioned to be received on the exterior of the wheel hub 62. A set screw 68 or other appropriate securing means fixes the cogged collar 66 nonrotatably with the wheel hub 62. Optionally, the wheel hub may have a land or a threaded bore 70 formed thereon to receive the set screw more securely.

A foot actuated cylinder portion 72 is selectively mounted to the base A adjacent the axle 62. The foot actuated cylinder includes a foot actuated lock button 74 which is depressed to extend a projection or ball member 76 into one of the cog recesses of the cogged collar 66 and lock the projection or ball member in its extended position. A foot actuated release button 78 is pressed downward to enable a spring, not shown, within the cylinder 72 to return the projection 76 to its retracted position out of engagement with the cogs of the cogged collar 66. In this manner, the wheel lock 60 is adapted for interconnection with existing rear wheel constructions.

Figure 6:
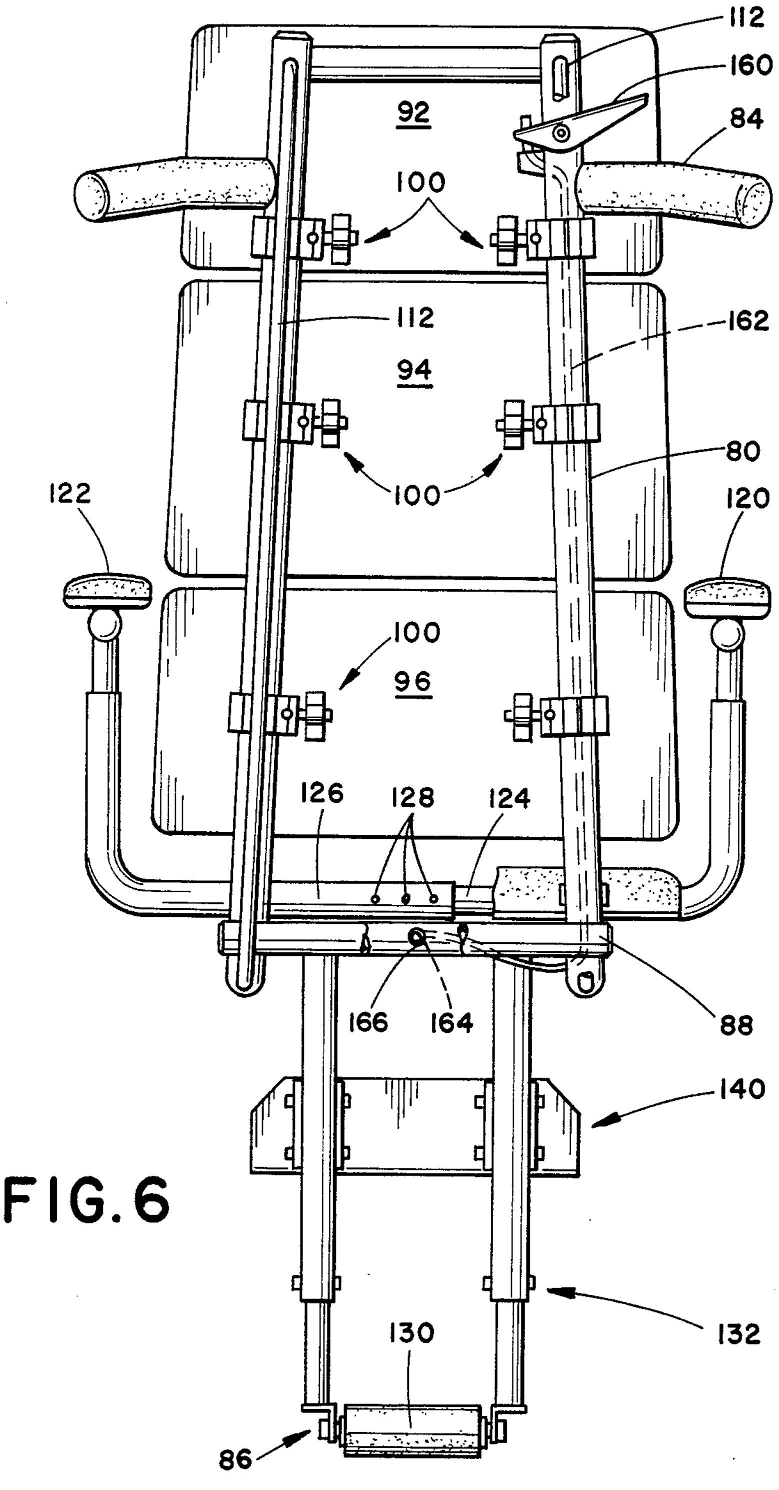
FIG. 6 is a rear view of the detachable seat illustrating a release and width adjustment structure.

Referring again to FIGS. 1 and 2, and referring further to FIG. 6, the detachable seat structure B includes a tubular frame portion 80 to which patient supporting pads or portions 82 are mounted. The seat frame 80 includes manual grasping means or handles 84 at an upper rearward end thereof and a vehicle floor engaging means 86 at a lower forward end thereof. A transverse seat frame tube 88 is disposed at a lower rearward edge for selective rotatable receipt in the slot 38 of the channel guide 30.

The patient supporting pads 82 include a seat pad or portion 90 and three patient back supporting pads or portions 92, 94, and 96.

Figure 7:
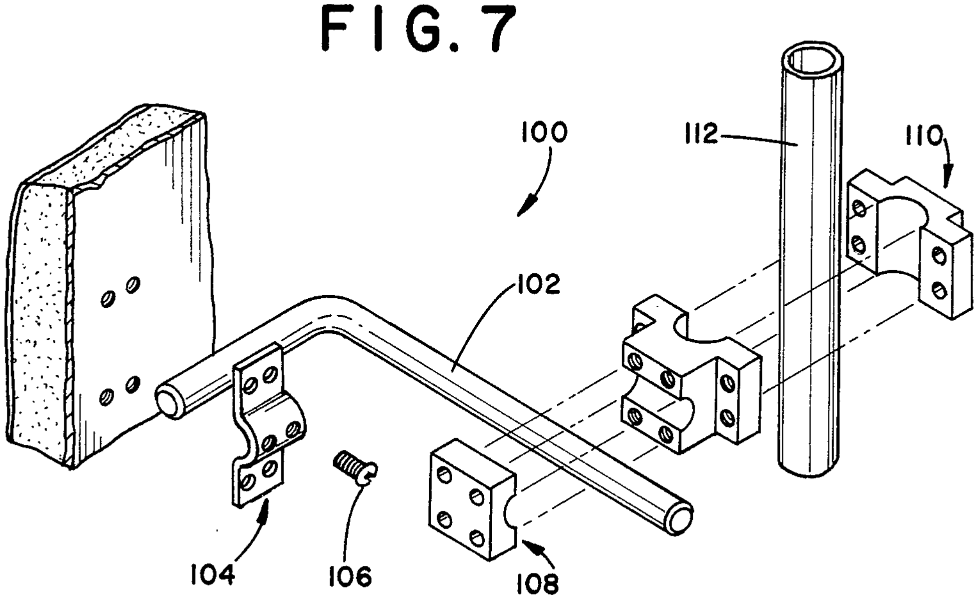
FIG. 7 illustrates details of an adjustment mechanism for adjusting the position of the back support pads for the detachable seat structure; and, FIG. 8 is a detailed view of an adjustable footrest.

With particular reference to FIGS. 6 and 7, the back support pads 92, 94, and 96 are adjustably connected with the seat frame 80 by an adjustable connection means 100. Each adjustable connection means includes an L-shaped bracket 102 which is connected with one of the patient back supporting pads by a U-bracket 104. Set screws 106 enable the back supporting section to be positioned and locked laterally and angularly relative to the L-shaped bracket. A first clamping means 108 selectively adjusts the distance between the seat frame 80 and the back supporting pad. A second clamping means 110 selectively clamps the L-shaped bracket with a seat pad mounting vertical frame section 112 to enable the relative height of each side of the back supporting pads to be adjusted.

With particular reference to FIGS. 2 and 6, a pair of height adjustable arm rests 120 and 122 are connected with telescoping arm rest tube members 124 and 126. Apertures 128 and a spring detent selectively enable adjustment of telescoping receipt of the members 124 and 126 to adjust the width between the arm rests. In this manner, the relative height and width of the arm rests are adjustable to facilitate mounting different width seat pads 90 with the seat frame 80. This enables a common seat frame 80 to be used with patient supporting pads of different widths.

With reference to FIGS. 1, 2, and 6, the vehicle engaging portion 86 includes a roller 130 at the lowermost end of the seat frame 80. A telescopic adjustment means 132 selectively adjusts the distance from the seat pad 90 to the roller 130 to accommodate entrance and exit from a variety of motor vehicles.

Figure 8:
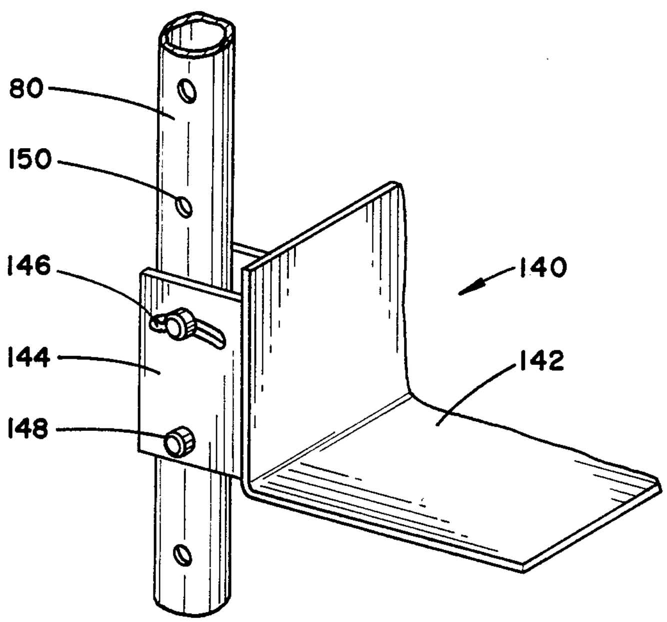

With particular reference to FIGS. 2 and 8, a footrest 140 is adjustably connected to a lower portion of the seat frame 80. The footrest includes a foot supporting portion 142 which is operatively connected to rearward extending flanges or plates 144. Each flange plate defines an arcuate aperture 146 and a pivot aperture 148 for mounting the footrest to the seat frame 80. The arcuate aperture 146 enables the angle of the footrest to be selectively adjusted. The seat frame 80 includes a plurality of mounting apertures 150 such that the height of the footrest may be readily adjusted.

With reference again to FIG. 6, a seat release mechanism includes a manual release handle 160 which is interconnected with a cable 162. The cable 162 extends through the interior of the seat frame 80 and interconnects with a seat locking structure 164 for retracting and extending a detent 166 or other seat locking means. The detent 166 is selectively received in the aperture in the platform locking means 36 of the base A.

In operation, the attendant grasps handles 84 to move the stroller from place to place. By engaging pedal lock 34 with one foot while tipping the seat structure with handles 84, the patient may be selectively tipped forward up to 10° and rearward up to 30°. When entering the vehicle, the stroller is pushed feet first toward the open door of the vehicle. The manual release handle 160 is depressed to release the forward portion of the seat structure. The attendant, grasping handles 84, tips the seat structure B rearward causing the transverse tube 88 to rotate in the channel guide slot 38 until the vehicle engaging roller 130 is raised above the door sill of the vehicle. The stroller is advanced forward with the floor engaging roller 130 passing over the door sill and forward wheel coasters 12 passing under the door sill. When the roller 130 is disposed in front of the passenger compartment seat adjacent the floor, the attendant locks rear wheel locks 60 with his feet to hold the base stationary. The attendant lifts the rearward portion of the seat structure B from the base A with handles 84. The seat structure is pivoted on roller 130 and the rearward portion of the seat structure swings over the passenger seat of the vehicle. After releasing the wheel locks, the folding release tab 48 is moved sideways and the base A is folded. The folded base is positioned in the trunk or other convenient storage location. The vehicle's seat belts are buckled for the safety of the patient.

To disembark from the vehicle, the base is opened and positioned adjacent the door of the vehicle with the front wheel coasters 12 disposed under the door sill. The attendant lifts the rearward portion of the seat structure B onto roller 130 such that it functions as a pivot. The rearward seat portion is swung out of the vehicle until the transverse tube 88 is generally parallel with the channel guide transverse slot 38. After the transverse tube is lowered into the guide channel slot, the attendant tips the seat structure rearward about the transverse tube sufficiently for the roller to clear the door sill as the stroller is withdrawn. The attendant tips the stroller forward until the seat lock detent 166 is received in the platform lock 36.

The invention has been described with reference to the preferred embodiment. Obviously, modifications and alterations will occur to others upon reading and understanding the preceding specification. It is intended that the invention be construed as including all such alterations and modifications insofar as they come within the scope of the appended claims or the equivalents thereof.

Having thus described a preferred embodiment, the invention is now claimed to be:

1. A stroller for facilitating access to motor vehicles, the stroller comprising:

(a) a base including:
  (i) a lower frame portion,
  (ii) wheels for supporting the lower frame portion such that at least a forward end of the lower frame portion is able to be rolled beneath an undercarriage of the motor vehicle,
  (iii) an upper frame portion operatively connected with the lower frame portion,
  (iv) a seat supporting structure operatively connected with the upper frame portion for supporting a detachable seat structure;

(b) the detachable seat structure including:
  (i) a patient supporting portion for supporting a patient,
  (ii) a seat frame which is selectively detachable with the base seat supporting structure, the seat frame being operatively connected with the patient supporting portion, (iii) a vehicle floor engaging means extending forward and downward from the patient supporting portion for selectively engaging a floor of the motor vehicle to support a forward portion of the detachable seat structure during entry into and departure from the motor vehicle, (iv) manual grasping means operatively connected with a rearward portion of the seat frame to facilitate lifting the rearward seat structure portion during entry into and departure from the motor vehicle.

2. The stroller as set forth in claim 1 wherein the base is collapsable.

3. The stroller as set forth in claim 1 wherein the base upper frame portion includes a generally vertical support member and a pair of telescopic members, the generally vertical and telescopic members being pivotally connected to the lower frame portion, and the base further including telescopic member locking means for selectively locking the telescopic members from undergoing relative telescopic movement for selectively locking the frame in an uncollapsed configuration.

4. The stroller as set forth in claim 1 wherein the base set supporting structure includes a platform means which is pivotally connected to the upper frame portion to enable the patient supporting portion to be tipped forward and aft.

5. The stroller as set forth in claim 4 further including a platform angular adjustment means for selectively fixing a pivotal orientation of the platform means for selectively locking the patient supporting portion in a selected fixed angular orientation.

6. The stroller as set forth in claim 4 further including seat and platform locking means for releasably connecting a forward portion of the detachable seat structure with the platform means.

7. The stroller as set forth in claim 6 further including a release lever operatively connected with an upper rear portion of the detachable seat structure and a flexible cable extending between the release lever and the seat and platform locking means.

8. The stroller as set forth in claim 6 wherein the base seat supporting structure includes a channel guide having a transverse slot therein for pivotally receiving a transverse member of the detachable seat structure therein.

9. The stroller as set forth in claim 8 wherein the channel guide includes a projection overhanging a forward edge of the slot such that the lip portion prevents the transverse member from being lifted from the slot when the seat and platform locking means locks the seat and platform forward portions together.

10. The stroller as set forth in claim 1 wherein the base seat supporting structure includes a channel guide having a transverse slot therein for pivotally receiving a transverse member of the detachable seat structure therein.

11. The stroller as set forth in claim 1 wherein the detachable seat structure further includes a pair of arm rests, the arm rests being telescopically interconnected such that the width between the arm rest is selectively adjustable.

12. The stroller as set forth in claim 1 wherein the vehicle floor engaging means includes a roller.

13. The stroller as set forth in claim 12 further including a telescopic interconnection between the roller and the seat frame such that the position of the front roller is selectively adjustable.

14. The stroller as set forth in claim 1 wherein the detachable seat structure further includes an adjustable footrest.

15. The stroller as set forth in claim 1 wherein the base further includes brake means for selectively locking at least one of the base wheels against rotation.

16. The stroller as set forth in claim 15 wherein each brake means includes a cogged collar which is operatively connectable to an associated wheel for rotation therewith and a plunger member for selectively engaging one of the cogs to prevent rotation of the wheel.

17. The stroller as set forth in claim 16 further including a foot operated lock member for selectively locking the projection in locking engagement with the cogs and a foot operated release for selectively releasing the plunger member from the cogs.

18. A stroller for facilitating access to motor vehicles, the stroller comprising:

(a) a base including:

a lower frame portion;

a pair of front wheel casters for supporting a front end of the lower frame portion, the front wheel casters being dimensioned such that the front end of the lower frame portion is able to be rolled under a rocker panel of the motor vehicle;

a pair of rear wheels operatively connected with the lower frame portion;

a rear wheel brake means operatively connected with at least one of the rear wheels for selectively locking the rear wheel against rotation;

an upper base frame portion foldably connected to the lower frame portion to be selectively folded generally parallel thereto;

upper frame portion locking means for selectively locking the upper base frame portion in an unfolded portion;

a seat supporting platform pivotally connected with the upper base frame portion for selectively supporting a detachable seat;

a channel member operatively connected with the upper base frame portion for rotatably receiving a transverse member of the detachable seat structure;

platform angular adjustment means for selectively adjusting the degree of tipping thereof;

(b) the detachable seat structure including:

a seat frame portion including the transverse member;

a patient supporting seat pad operatively connected to the seat frame;

a plurality of patient back supporting pads;

adjustable connecting means for adjustably connecting the patient back supporting pads to the seat frame;

at least one handle operatively connected to an upper rear portion of the seat frame;

arm rests telescopically interconnected with each other and slidably received on the seat frame for selectively adjusting a width therebetween;

a foot support structure adjustably mounted on a lower, forward portion of the seat frame;

a roller operatively connected with a forward, lowermost portion of the seat frame for selectively engaging a floor of the motor vehicle.

* * * * *